(12) United States Patent
Broome et al.

(10) Patent No.: US 9,392,335 B2
(45) Date of Patent: Jul. 12, 2016

(54) FRAGMENTED CONTENT

(75) Inventors: Allen Broome, Broomfield, CO (US);
Joseph Kiok, West Chester, PA (US);
John Leddy, Bryn Mawr, PA (US);
Brian Field, Evergreen, CO (US); Eric Rosenfeld, Denver, CO (US); Weidong Mao, West Windsor, NJ (US); Sree Kotay, Philadelphia, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 13/412,922

(22) Filed: Mar. 6, 2012

(65) Prior Publication Data

US 2013/0239145 A1 Sep. 12, 2013

(51) Int. Cl.
| | |
|---|---|
| H04N 21/262 | (2011.01) |
| H04N 21/482 | (2011.01) |
| G06Q 50/00 | (2012.01) |
| H04N 21/845 | (2011.01) |
| H04N 21/231 | (2011.01) |
| H04N 21/234 | (2011.01) |
| H04N 21/2668 | (2011.01) |
| H04N 21/81 | (2011.01) |
| H04N 21/25 | (2011.01) |
| H04N 21/4788 | (2011.01) |

(52) U.S. Cl.
CPC ........... *H04N 21/4825* (2013.01); *G06Q 50/01* (2013.01); *H04N 21/23109* (2013.01); *H04N 21/23418* (2013.01); *H04N 21/252* (2013.01); *H04N 21/2668* (2013.01); *H04N 21/26258* (2013.01); *H04N 21/4788* (2013.01); *H04N 21/4821* (2013.01); *H04N 21/812* (2013.01); *H04N 21/8456* (2013.01)

(58) Field of Classification Search
CPC ................... H04N 7/17318; H04N 21/26258; H04N 21/4825
See application file for complete search history.

(56) References Cited

U.S. PATENT DOCUMENTS

| | | | |
|---|---|---|---|
| 5,996,015 A | 11/1999 | Day et al. | |
| 7,103,906 B1 | 9/2006 | Katz et al. | |
| 7,281,034 B1 | 10/2007 | Eyal | |
| 7,685,459 B1 | 3/2010 | De Spiegeleer et al. | |
| 8,370,396 B2 | 2/2013 | Blaxland et al. | |
| 8,473,993 B2 | 6/2013 | Athias | |
| 8,813,151 B2 | 8/2014 | Athias | |
| 9,253,548 B2 | 2/2016 | Swaminathan et al. | |
| 2002/0083468 A1 | 6/2002 | Dudkiewicz | |
| 2002/0104099 A1 | 8/2002 | Novak | |
| 2002/0124182 A1 | 9/2002 | Bacso et al. | |
| 2004/0117842 A1 | 6/2004 | Karaoguz et al. | |
| 2004/0236568 A1* | 11/2004 | Guillen et al. | 704/201 |
| 2005/0015464 A1 | 1/2005 | Young | |

(Continued)

OTHER PUBLICATIONS

Extended European Search Report—EP 12184385.8—Mailing Date: Sep. 4, 2013.

(Continued)

*Primary Examiner* — Ricky Chin
(74) *Attorney, Agent, or Firm* — Banner & Witcoff, Ltd.

(57) ABSTRACT

An apparatus, method, system and computer-readable medium are provided for generating one or more segments associated with content. The segments may include fragments that may correspond to portions of the content. The segments and/or the fragments may be included in a playlist, and may be based at least in part on a user selection.

20 Claims, 5 Drawing Sheets

(56) References Cited

U.S. PATENT DOCUMENTS

| | | | |
|---|---|---|---|
| 2005/0022237 A1* | 1/2005 | Nomura | 725/39 |
| 2005/0028194 A1* | 2/2005 | Elenbaas et al. | 725/32 |
| 2005/0240494 A1 | 10/2005 | Cue et al. | |
| 2006/0090186 A1* | 4/2006 | Santangelo et al. | 725/87 |
| 2006/0173916 A1 | 8/2006 | Sibley et al. | |
| 2007/0094690 A1 | 4/2007 | Rodriguez et al. | |
| 2008/0010342 A1* | 1/2008 | Gebhardt et al. | 709/204 |
| 2008/0060001 A1* | 3/2008 | Logan et al. | 725/34 |
| 2008/0092168 A1* | 4/2008 | Logan et al. | 725/44 |
| 2008/0147711 A1 | 6/2008 | Spiegelman et al. | |
| 2009/0063976 A1* | 3/2009 | Bull et al. | 715/716 |
| 2009/0165031 A1 | 6/2009 | Li et al. | |
| 2009/0172752 A1 | 7/2009 | Lopatic | |
| 2009/0204663 A1 | 8/2009 | Patwari | |
| 2009/0228919 A1 | 9/2009 | Zott et al. | |
| 2009/0265742 A1 | 10/2009 | Schwartz et al. | |
| 2009/0313295 A1 | 12/2009 | Blaxland et al. | |
| 2010/0100899 A1 | 4/2010 | Bradbury et al. | |
| 2010/0125882 A1* | 5/2010 | Athias | 725/88 |
| 2010/0325303 A1 | 12/2010 | Wang et al. | |
| 2011/0077046 A1 | 3/2011 | Durand et al. | |
| 2011/0218998 A1* | 9/2011 | Mercer et al. | 707/737 |
| 2012/0020647 A1 | 1/2012 | Vogel | |
| 2012/0069131 A1 | 3/2012 | Abelow | |
| 2012/0114312 A1 | 5/2012 | Sutherland et al. | |
| 2012/0117595 A1 | 5/2012 | Svendsen et al. | |
| 2012/0117598 A1 | 5/2012 | Pons et al. | |
| 2012/0233138 A1 | 9/2012 | Nijim et al. | |
| 2012/0284745 A1* | 11/2012 | Strong | 725/34 |
| 2013/0073673 A1 | 3/2013 | McMahon et al. | |
| 2013/0138677 A1 | 5/2013 | Blaxland et al. | |
| 2013/0227621 A1 | 8/2013 | Barton | |
| 2013/0347036 A1 | 12/2013 | Athias | |
| 2014/0006478 A1 | 1/2014 | Eguchi et al. | |
| 2014/0101329 A1 | 4/2014 | Brueck et al. | |

OTHER PUBLICATIONS

Canadian Office Action—CA Appl. 2,683,178—dated Nov. 17, 2015.

Mar. 3, 2011 Office Action issued in European Patent Application No. 09173259.4.

Kawamoto et al, "On 1st Birthday, iTunes Unwraps New Features," Jan. 1, 2004, XP002996197 URL: http://news.com.com/2103-1027_3-5201599.html?tag=st.util.pring>.

Apr. 27, 2010 Search Report issued in European Application No. 09 17 3259.

* cited by examiner

FRAGMENTED CONTENT

BACKGROUND

Computing technologies have changed the way people go about their daily lives. In the context of content delivery, users now demand the ability to consume and view a variety of content at a time and place of their choosing.

Content delivery models differ from one another. For example, in a video on demand (VoD) environment, content may be delivered using a push-streaming model. Other technologies that leverage fragmented video and Internet protocol delivery (e.g., HTTP) may use a client-pull model. Even these newer technologies use very different models for, e.g., VOD and linear delivery. A need exists for allowing greater flexibility to users to tailor content received in accordance with any delivery model.

SUMMARY

This summary is not intended to identify critical or essential features of the disclosure provided herein, but instead merely summarizes certain features and variations thereof.

In some illustrative embodiments, content (e.g., a video) may be divided up into one or more segments. Boundaries for the various segments may be based on one or more inputs or factors, such as the existence of a break, a rating, a genre, a plot line, characters, etc. The segments may have different start and/or end times.

In some embodiments, one or more segments may include one or more fragments. The fragments may correspond to a portion of a content asset or item, such as a program.

In some embodiments, linear content delivery may be implemented as a playlist of assets. The assets included in the playlist may be based at least in part on a user selection. In some embodiments, a user interface, such as an electronic programming guide (EPG), an interactive programming guide (IPG), etc., may be used to facilitate the user's selections.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed and illustrated in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
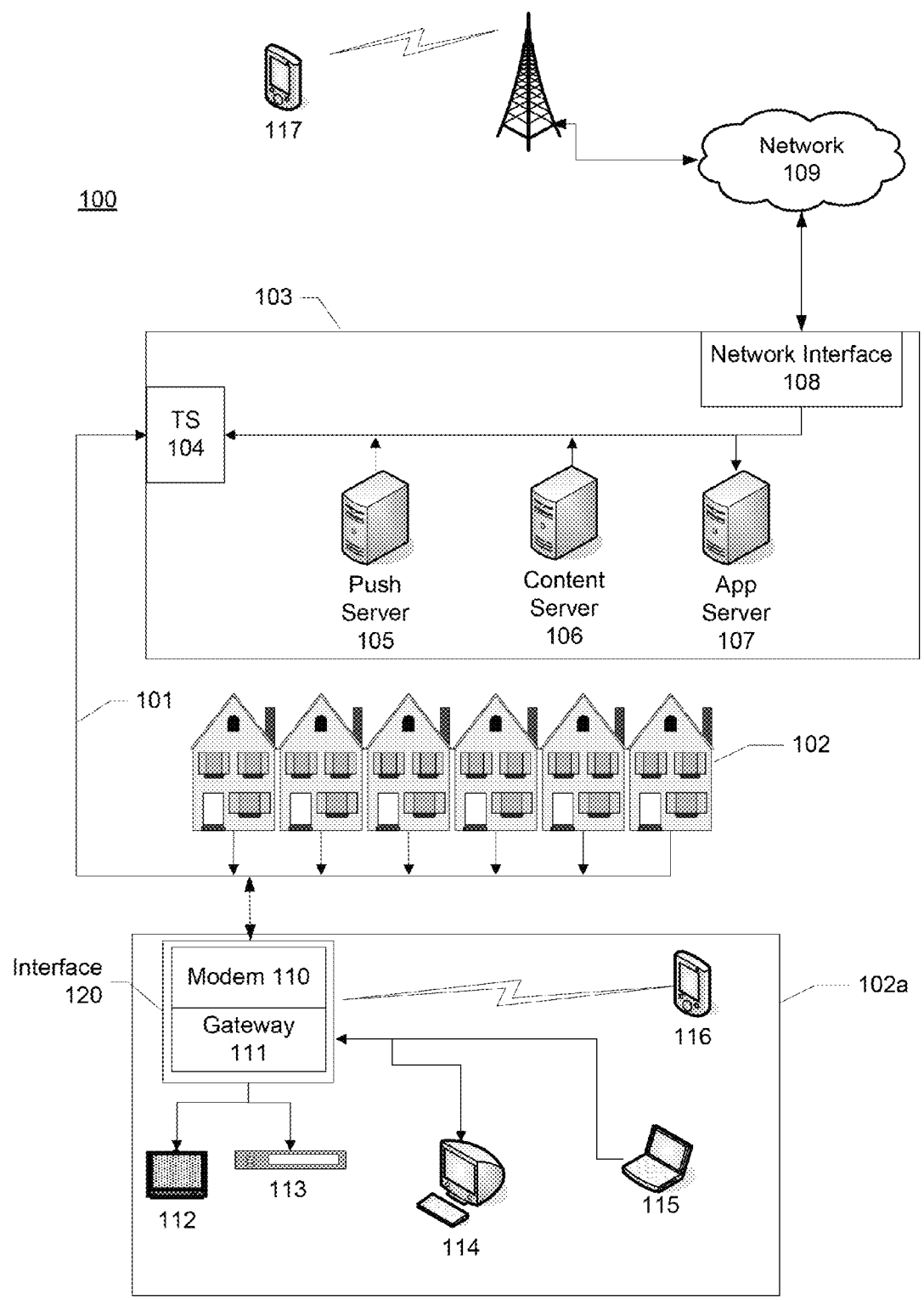
FIG. 1 illustrates an example network.

FIG. 1 illustrates an example network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. Cable-Labs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of computing devices such as servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content assets to users in the homes. These content assets may be, for example, video on demand movies, television programs, songs, text listings, etc. The content server 106 may include software to validate user identities and entitlements, locate and retrieve requested content assets, encrypt the content assets, and initiate delivery (e.g., streaming) of the content assets to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include an interface 120. The interface 120 may comprise, in one aspect, a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops, tablets and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
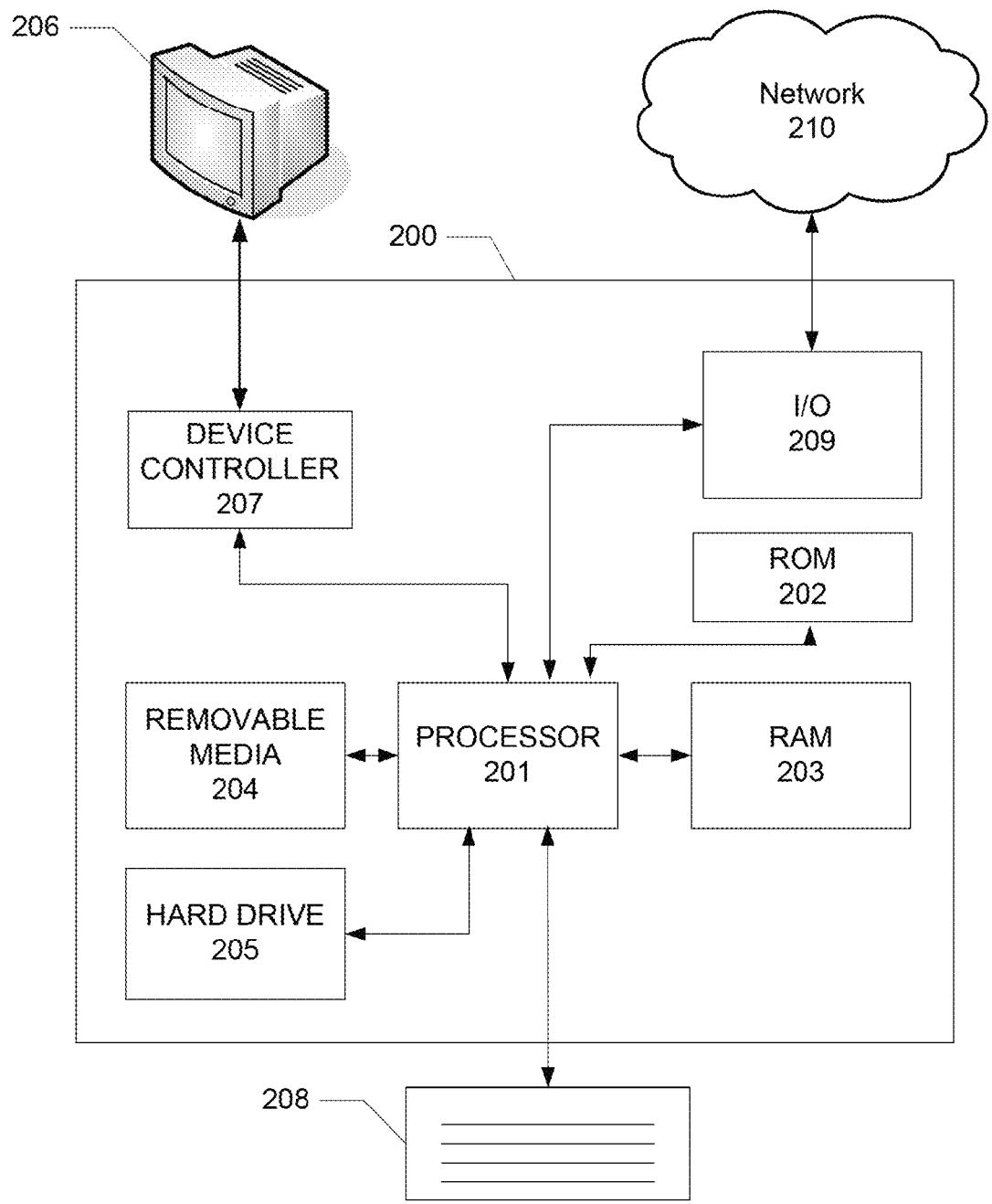
FIG. 2 illustrates an example computing device on which the various elements described herein can be implemented.

FIG. 2 illustrates general hardware and software elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Aspects of this disclosure may be implemented to provide one or more models of content delivery, such as audio, video and data (e.g., closed captioning, alerts, etc.) delivery. In some embodiments, a single model of content delivery may be used, potentially irrespective of the type of content that is being delivered. In some embodiments, video codecs, protocols, and control plane flows may be provided on a constant or consistent basis. In some embodiments, various features (e.g., Start Over and Digital Video Recording (e.g., network DVR)) may be provided. For purposes of illustrative simplicity and consistency, the delivered content asset is described as comprising video. The techniques described herein can be adapted and applied to other forms or types of content delivery, such as a delivery of text files, audio (e.g., music, voice), pictures/images, emails, instant messages, etc.

Figure 3:
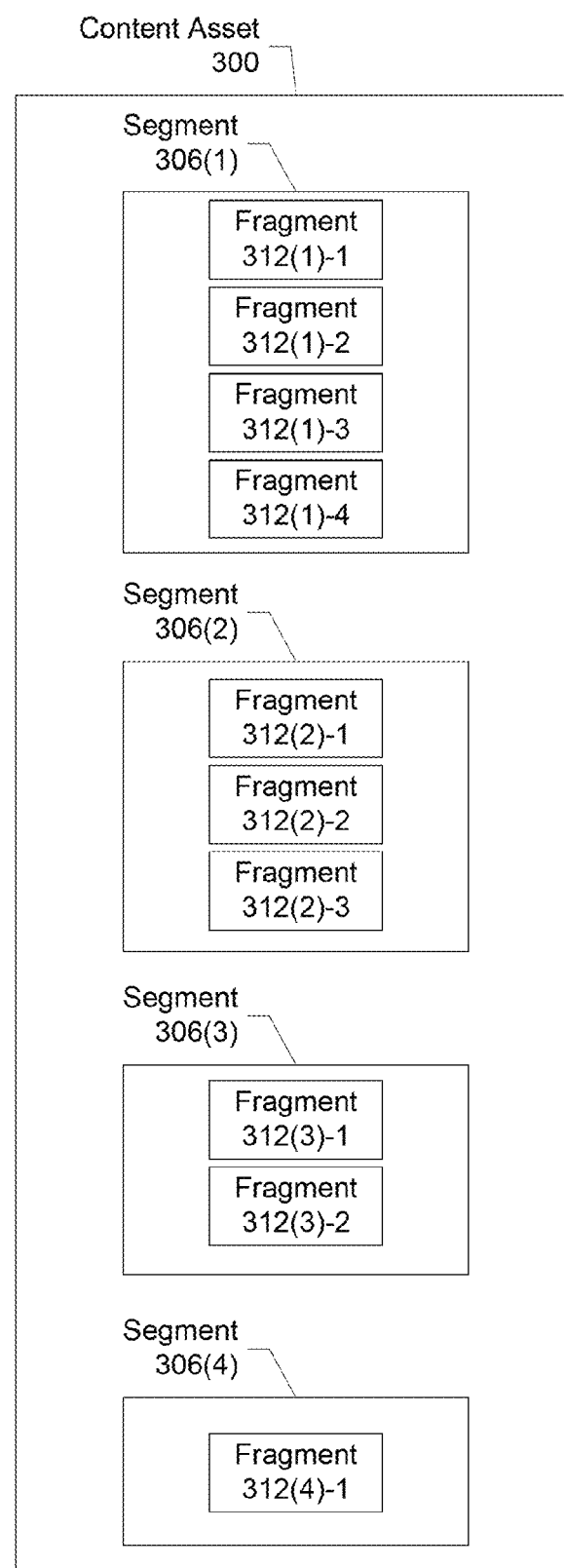
FIG. 3 illustrates an example content asset demonstrating one or more aspects of this disclosure.

FIG. 3 illustrates a content asset 300 in accordance with one or more aspects of this disclosure. Content asset 300 may be delivered from a server, such as a server located at central location 103 of FIG. 1, to one or more user or client devices, such as a gateway 111 or STB 113 of FIG. 1. Content asset 300 may be associated with a video, audio, or other data.

Content asset 300 may include one or more segments 306. Segments 306 may correspond to one or more portions of content asset 300. Boundaries between segments 306 may be based at least in part on the existence or location of one or more commercial breaks, changes in plot, introduction of characters, changes in audio (e.g., a change in song), or other various criteria.

In FIG. 3, four segments are shown—306(1), 306(2), 306(3), and 306(4). A content asset may comprise any number of segments (e.g., segments 306). In some embodiments, content asset 300 may be organized, configured, or arranged as a file, a data structure, or the like.

Segments 306(1)-306(4) may be of various sizes or dimensions (e.g., which may be measured in terms of a memory capacity needed to store a segment, a run-length or duration of the segment, etc.). In other words, the size of any given segment (e.g., 306(1)) shown in FIG. 3 may be different from the size of other segments (e.g., 306(2)-306(4)). In some embodiments, two or more of the segments may be the same size/dimension. In some embodiments, one or more of segments 306(1)-306(4) may be organized, configured, or arranged as a file, a data structure, or the like.

Segments 306(1)-306(4) may include one or more fragments 312. Fragments 312 may correspond to one or more portions of a segment 306. Boundaries between segments fragments 312 may be based at least in part on the existence or location of one or more commercial breaks, changes in plot, introduction of characters, changes in audio (e.g., a change in song), or other various criteria.

As shown, segment 306(1) may include fragments 312(1)-1 through 312(1)-4, segment 306(2) may include fragments 312(2)-1 through 312(2)-3, segment 306(3) may include fragments 312(3)-1 through 312(3)-2, and segment 306(4) may include fragment 312(4)-1. In some embodiments, one or more of the segments 306 may include more or less fragments 312 than what is shown in FIG. 3. A fragment 312 may be representative of a portion of a program associated with content asset 300.

In some embodiments, segments 306 may be generated based at least in part on a passage of time, such as a passage of a predetermined amount of time. For example, if a program corresponding to content asset 300 is twenty-eight (28) minutes in length in terms or run/viewing time, each of segments 306(1)-306(4) may correspond to seven (7) minutes of the program. In some embodiments, the time duration associated with each of the segments might not be equal. Thus, for the same twenty-eight minute program, segment 306(1) may correspond to ten minutes, segment 306(2) may correspond to eight minutes, segment 306(3) may correspond to six minutes, and segment 306(4) may correspond to four minutes. The values used are illustrative, and other values may be used in some embodiments.

In some embodiments, segments 306 may be generated based at least in part on one or more events, such as a commercial break. For example, if content asset 300 corresponds to a program (e.g., a television program), each of segments 306(1)-306(4) may correspond to the portion of a program excluding commercials or advertisements. Thus, a gap between segments 306(1) and 306(2) may correspond to a first commercial break, a gap between segments 306(2) and 306(3) may correspond to a second commercial break, and a gap between segments 306(3) and 306(4) may correspond to a third commercial break. In this manner, content asset 300 may be representative of the program excluding commercials or advertisements. Events other than commercial breaks may be used for purposes of determining segment boundaries. For example, a change in a scene or setting, story-line or plot, introduction or removal of a character from a particular scene, etc., may be used to establish segment boundaries.

In some embodiments, segments 306 may be generated based at least in part on selections made by a user or client device. For example, and referring to FIG. 4, a user may be presented with information regarding a program, titled "The George and Jerry Show," via a user interface (UI) 404, such as an electronic programming guide (EPG), an interactive programming guide (IPG), a smartphone application, or any other interface. UI 404 may include a preview area 410 that may be used to display one or more pictures associated with the program and/or play one or more clips or portions of the program. Preview area 410 may also be used to play a clip in response to a selection of one or more fragments 312 from fragment listing 414. In some embodiments, UI 404 may include a segment listing (not shown in FIG. 4) to facilitate playing or displaying content associated with a segment 306.

Figure 4:
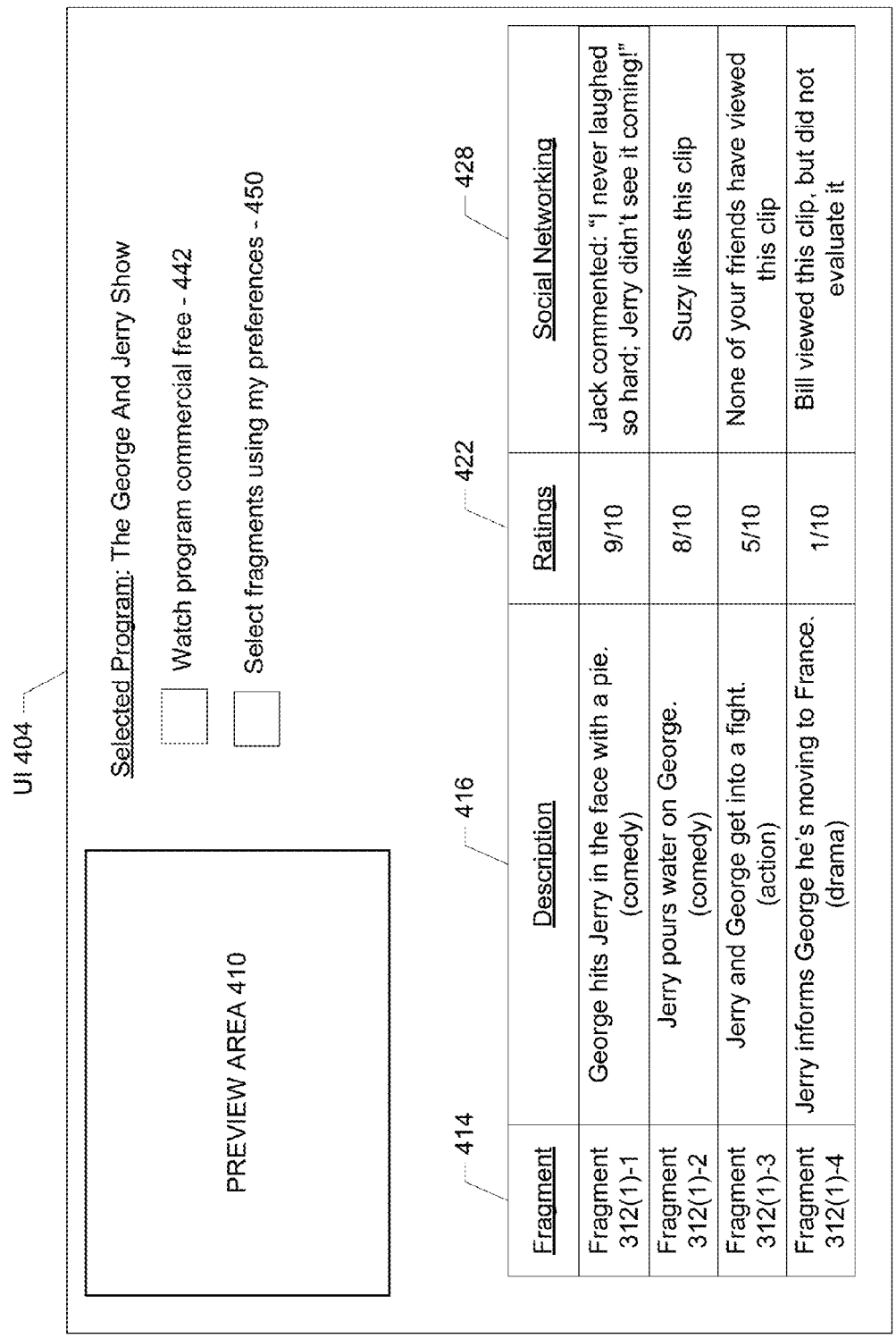
FIG. 4 illustrates an example user interface demonstrating one or more aspects of this disclosure.

The information presented in UI 404 may include descriptions 416 for one or more of the fragments 312. For example, if in the portion of the program corresponding to fragment 312(1)-1, a character named George throws a pie in the face of his friend Jerry, a description may be provided such as "George hits Jerry in the face with a pie" as shown in FIG. 4. Such a description may originate from the content creator or provider, other users, or any other source.

The presented information may include ratings 422 received from other users. For example, the user may be presented with an average rating or score that other users provided regarding the fragments 312. Continuing the above example, a user may see that other users that have viewed fragment 312(1)-1 rated it a 'nine' on a scale of one-to-ten. Other ratings formats or scales may be used, such as ratings on a "four stars" scale. In some embodiments, the ratings may comprise an indication of the suitability of the content for a particular audience. For example, the ratings may comprise an indication that the content or fragment is generally not suitable for persons under a specified age, such as age seventeen.

The presented information may further include a social networking category 428. For example, the user may be able to view comments provided by her 'friends' or 'buddies' from a social networking website. One of the user's friends named Jack may have commented "I never laughed so hard; Jerry didn't see it coming!" in reference to fragment 312(1)-1. Jack's comment may encourage a user accessing UI 404 to select fragment 312(1)-1 for inclusion in, e.g., segment 306(1) or content asset 300. Exemplary social networking status/information 428 provided in connection with fragments 312(1)-2 through 312(1)-4 is shown in FIG. 4.

Additional options for user selection may be provided with respect to the fragments 312. For example an option to allow the user to watch the program commercial free 442 may be provided via a checkbox, radio button, or the like. In some embodiments, the lack of commercials may be compensated for, e.g., the user may be charged a fee, or may have to watch a relatively long commercial at the outset, in order to watch the remainder of the program commercial free. The user may select fragments that correspond to a user profile or the user's preferences 450. For example, the user may specify in advance that she is primarily interested in viewing content that is categorized as "comedy." If the user selects the checkbox associated with preferences 450, fragments 312(1)-1 and 312(1)-2 may be selected, as those fragments are comedic in nature as reflected in description 416. In some embodiments, suggestions may be presented to the user for purposes of selection. For example, a user may be presented with suggestions regarding fragments 312 based at least in part on, e.g., the user's past selections.

The options and information provided or displayed in connection with UI 404 are illustrative. In some embodiments, some of the options and information provided may be optional, and options and/or information not shown may be included. Based on a user's choices, a playlist may be generated or created. The playlist may be created at a user device or client, or by the content provider. Content asset 300 shown in FIG. 3 may be a result of, or indicative of, such a playlist. In some embodiments, a timing model, such as coordinated universal time (UTC), may be used, e.g., by a user device, to construct a playlist. For example, a timing model may be used to ensure that playback of a content asset, or portion thereof, occurs at a particular time or in accordance with a particular schedule. In the event that UTC is used, a client/user device may obtain a current UTC time from one or more devices, such as one or more servers, one or more satellites, etc.

In some embodiments, the delivery of content, such as the delivery of a program, may be based on a linear or non-linear model, and may be transmitted via a broadcast, multicast, unicast, or another method. The model may provide for a distribution of content independent of the number or type of user/client devices receiving or consuming the content. In some embodiments, the delivery may be treated as a playlist of VOD assets. In some embodiments, a playlist interface or template similar to that described above in connection with FIG. 4 may be provided to a user device (e.g., a set-top box, a mobile device, a laptop computer, etc.) with enough information or details to construct a playlist.

While discussed above in the context of a program, aspects of this disclosure may be applied to generate a content asset or playlist involving more than one program, or more generally, one or more content items of potentially various types.

In some embodiments, a manifest may be used. The manifest may be organized, configured, or arranged as a file, a data structure, or the like. The manifest may contain a playlist. The manifest may relate to one or more assets, such as one or more content assets.

In some embodiments, such as embodiments associated with linear or live streaming of content, the manifest may contain one or more of an index, a pointer, and/or a reference time line and name space (e.g., a URL) for accessing one or more segments or fragments. The manifest may support random access features for using reference frames, so that a user may interact with one or more reference frames. For example, random access features included in the manifest may allow time shifted viewing of linear content, fast forward and rewind control, instant viewing of a first frame (e.g., Start Over capabilities), or other controls that permit a user to select a frame of the content asset to view. In some embodiments, the manifest may support ad insertion, such as linear ad insertion. For example, the manifest may include information identifying ad insertion points for one or more content assets, and the information may be used to determine where to insert ads in the one or more content assets, such as between segments or fragments.

Figure 5:
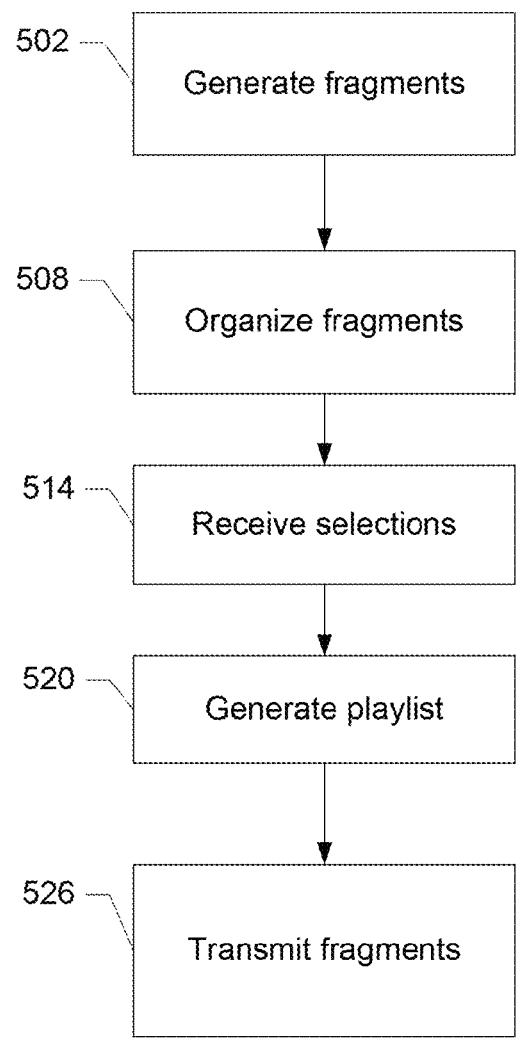
FIG. 5 illustrates an example method for demonstrating one or more aspects of this disclosure.

FIG. 5 illustrates a method suitable for demonstrating one or more aspects of this disclosure. In some embodiments, the various blocks shown in FIG. 5 may be included in, associated with, or executed in accordance with one or more of the components, devices, or environments described above in connection with FIGS. 1-4. The method of FIG. 5 may be used to generate a playlist, a content asset, and/or a manifest.

In step 502, one or more fragments may be generated. For example, in the context of a program, the one or more fragments may correspond to one or more portions of the program, such as one or more scenes. In the context of an audio asset (e.g., music), a fragment may correspond to one or more portions of a recording, such as the chorus to a particular song. In some embodiments, one or more fragments may be generated at a user device, a client, or a content or service provider.

In step 508, the fragments generated in connection with step 502 may be organized. For example, the fragments may be arranged as one or more segments (e.g., segments 306 of FIG. 3). The organization may be based on one or more factors or conditions. For example, the fragments may be organized based on genre (e.g., whether the fragment is comedic, dramatic, involves action, incorporates audio, etc.), characters, ratings, etc.

In step 514, one or more selections may be received. The selections may correspond to one or more fragments, one or more segments, etc. The selections may be based at least in part on user selections (e.g., via UI 404 of FIG. 4). The selections may be based at least in part on choices made by a service, network, or content provider. For example, a particular service, network, or content provider may provide content for distribution, potentially in accordance with a schedule.

In step 520, a playlist may be generated. The playlist may be based at least in part on the selections received in connection with step 514. For example, the selections received in relation to step 514 may be stored in connection with the playlist generated in step 520.

In step 526, the fragments may be transmitted to a user. For example, the fragments may be transmitted from one or more devices, such as one or more servers, in connection with any desired distribution model. Fragments of interest, such as those fragments determined to be included in the playlist generated in step 520, may be stored or saved and/or presented or output to one or more devices. The one or more output devices may be included in, or associated with, a user device.

The method of FIG. 5 is illustrative. In some embodiments, one or more of the steps (or portions thereof) may be optional. One or more of the steps (or portions thereof) may be executed in an order or sequence different from that shown. In some embodiments, one or more steps not shown may be included.

In some embodiments, the method of FIG. 5 may be executed at a server, at a user/client device, partially at both a server and a user/client device, or potentially at or in combination with one or more additional devices. For example, in the context of real-time delivery of a linear program, a user/client device may receive some or all of the fragments associated with the program and may selectively pull those fragments from a channel, a stream, or other delivery mechanism or medium that meet the criteria associated with the selections of step 514.

Aspects of this disclosure may be used to decouple fragments or a fragmentation process from typical program boundaries. In some embodiments, a program (or portions thereof) may be represented by one or more playlists of fragments (or segments). The fragments (or segments) may be represented by offsets or indexes in relation to the start or end of the program (or any other point of reference). In some embodiments, the level of abstraction provided may allow for metadata updates to be used to, e.g., correct for program over or under runs, DVR partial recording, or any other boundary related consideration. For example, a delivery of a fragment or segment may be shifted in time in response to the metadata update.

Aspects of this disclosure may be used to decouple a client from having to go to a centralized network-streaming source to retrieve a new manifest (e.g., a new manifest file). A client may generate a manifest based on one or more cached playlist templates, which may result in greater or improved scalability.

In some embodiments, DVR and Start Over capabilities might not be statically managed by the size of the manifest or a sliding window associated therewith. For example, for linear content, a user device may be permitted to select and/or view a first-in-time fragment and/or segment (e.g., the first fragment identified in a manifest, such as a fragment at 5:00 PM), a fragment and/or segment associated with the current time (e.g., a fragment associated with 5:10 PM if the current time is 5:10 PM), and any fragment and/or segment in between (e.g., any fragment between 5:00 and 5:10 PM). In some embodiments, the user device may be prevented from selecting fragments and/or segments outside of this window. Alternatively, the user device may be permitted to select and view any fragment and/or segment including and since the user tuned in (e.g., any fragment between now and 5:00 PM if the user tuned in at 5:00 PM). In some embodiments, a user device may manage a set of rules around availability. For example, if a user device attempts to rewind to a fragment (or segment) prior to the first fragment (or segment) identified in a first manifest, the user device may request a second manifest identifying the additional fragments (or segments) and string the first and second manifests together. In some embodiments, a server (e.g., a server located at central office 103) may automatically provide the second manifest to the user device, with or without a request from the user device. While the above example illustrates stringing two manifests together, any number of manifests may similarly be strung together. Asset/content availability may also be enforced by entitlement or digital rights management (DRM) rules. For example, asset/content encryption keys may be changed at predetermined intervals, and the DRM rules may govern user device decryption permissions (e.g., by providing a decryption key to permit decryption).

In some embodiments, a manifest (or a portion thereof) may be generated for a given time period. In some embodiments, a manifest (or portion thereof) may be generated on demand, potentially for content that has not yet been created.

While some examples have been described above in the context of television technology and communications, aspects of this disclosure may readily be applied to, and adapted to be operative on, one or more other communication systems. Those communication systems may include computer networks, satellite networks, cellular networks, and the like.

Although not required, various aspects described herein may be embodied as one or more methods, systems, apparatuses, and/or as transitory and/or non-transitory computer-readable media storing executable instructions. Accordingly, those aspects may take the form of an entirely hardware embodiment, an entirely software embodiment, an entirely firmware embodiment, or an embodiment combining software, firmware, and/or hardware. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The methodological acts and processes described herein may be tied to particular machines or apparatuses. For example, as described herein, fragments or segments may be generated at one or more devices, such as servers and user devices. More generally, one or more apparatuses may include one or more processors and memory storing instructions, that when executed by the one or more processors, cause the one or more apparatuses to perform the methodological acts and processes described herein. Furthermore, the methodological acts and processes described herein may perform a variety of functions including transforming an article (e.g., content asset) into a different state or thing (e.g., fragments or segments that may be arranged as part of a content asset or playlist, potentially adhering to an on-demand pull model).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
   causing, by a computing device, transmission of a manifest for displaying one or more fragments of a content item and one or more user comments received from a web site, wherein the manifest associates the one or more fragments with the one or more comments, and wherein the content item is a program comprising more than one fragment associated with a portion of the content item;
   causing concurrent presentation of:
      selectable fragments of the one or more fragments,
      the one or more user comments, and
      a rating received for at least one of the one or more fragments;
   receiving an indication that at least one of the one or more fragments have been selected for inclusion in a listing;
   generating the listing comprising the selected at least one of the one or more fragments; and
   causing display of the selected at least one of the one or more fragments based on a transmission of the listing.

2. The method of claim 1, wherein receiving the indication that the at least one of the one or more fragments have been selected comprises receiving a selection from a user via at least one of a video program listing, an interactive programming guide (IPG), and a mobile computing device application.

3. The method of claim 1, wherein the web site is associated with at least one user.

4. A method comprising:
   determining, by a computing device, a plurality of portions of content associated with one or more content items;
   causing concurrent presentation of:
      selectable portions of the plurality of portions of content,
      one or more user comments associated with at least one of the plurality of portions of content and received from a web site,
      a rating received for at least one of the plurality of portions of content, and
      an option for ad-free content;
   receiving at least one indication indicating a selection of one or more portions of the plurality of portions of content and indicating a selection of the option for ad-free content;
   determining based on the at least one indication, a plurality of fragments, from the one or more portions, wherein the fragments exclude ad content based on ad insertion information;
   generating a listing indicating the plurality of fragments; and causing, based on the listing, transmission of at least one of the plurality of fragments.

5. The method of claim 4, wherein determining the plurality of fragments is further based on a passage of a predetermined amount of time.

6. The method of claim 4, further comprising:
   grouping the plurality of fragments into the listing based on a genre associated with at least one of the plurality of fragments.

7. The method of claim 4, further comprising:
   transmitting the listing to a user device.

8. The method of claim 4, further comprising:
   transmitting a social networking status from social networking connections of a second user for at least one fragment of the plurality of fragments.

9. The method of claim 4, further comprising:
grouping the plurality of fragments into the listing based on at least one user preference.

10. The method of claim 4, further comprising:
grouping the plurality of fragments into the listing based on a rating associated with at least one of the plurality of fragments.

11. The method of claim 4, wherein the ad insertion information is stored in a manifest and the manifest further comprises at least one of an index, a pointer, and a reference to at least one random access frame inside at least one of the plurality of fragments.

12. The method of claim 4, wherein the one or more content items comprise a first content item having a first type and a second content item having a second type, and further comprising:
grouping a first group of the plurality of fragments into a first segment comprising fragments of the first type; and
grouping a second group of the plurality of fragments into a second segment comprising fragments of the second type.

13. The method of claim 4, further comprising inserting a gap corresponding to a commercial break into the listing based on the ad insertion information.

14. A method comprising:
receiving, by a computing device, at least one user fragment preference;
storing the at least one user fragment preference in a profile associated with a user;
causing concurrent presentation of:
a plurality of fragments,
an option to select, based on the profile, selectable fragments from the presented plurality of fragments,
one or more user comments associated with at least one of the selectable fragments and received from a web site, and
a rating received for at least one of the selectable fragments;
wherein the plurality of fragments are associated with one or more content assets, and wherein each of the one or more content assets comprises more than one fragment associated with a portion of the content asset;
in response to receiving a selection of the option, selecting one or more selectable fragments based on the at least one user fragment preference stored in the profile;
generating a listing comprising the selected one or more selectable fragments; and
causing the selected one or more selectable fragments to be displayed.

15. The method of claim 14, wherein the at least one user fragment preference is based on at least one of: a genre, previous fragment selections of the user, and a rating.

16. The method of claim 14, wherein the one or more content assets comprise a first content asset having a first type and a second content asset having a second type, and further comprising:
grouping a first group of the plurality of fragments into a first segment comprising fragments of the first type; and
grouping a second group of the plurality of fragments into a second segment comprising fragments of the second type.

17. The method of claim 14, further comprising:
grouping the at least one selectable fragments based on the rating received for the at least one of the selectable fragments.

18. The method of claim 14, wherein receiving the selection of the option comprises receiving the selection of the option from the user via at least one of a video program listing, an interactive programming guide (IPG), and a mobile computing device application.

19. The method of claim 14, wherein the listing further comprises at least one of an index, a pointer, and a reference to at least one random access frame inside at least one of the selected one or more selectable fragments.

20. The method of claim 14, wherein the web site is associated with the user.

* * * * *